United States Patent
Vallius

(10) Patent No.: US 10,117,381 B2
(45) Date of Patent: Nov. 6, 2018

(54) CUTTING TOOL AND WORK MACHINE

(71) Applicant: Vallius Forestry Oy Ltd., Ahveninen (FI)

(72) Inventor: Lauri Vallius, Ahveninen (FI)

(73) Assignee: VALLIUS FORESTRY OY LTD., Ahveninen (FI)

( * ) Notice: Subject to any disclaimer, the term of this patent is extended or adjusted under 35 U.S.C. 154(b) by 27 days.

(21) Appl. No.: 15/127,193

(22) PCT Filed: Mar. 20, 2015

(86) PCT No.: PCT/FI2015/050188
§ 371 (c)(1),
(2) Date: Sep. 19, 2016

(87) PCT Pub. No.: WO2015/170000
PCT Pub. Date: Nov. 12, 2015

(65) Prior Publication Data
US 2017/0135284 A1    May 18, 2017

(30) Foreign Application Priority Data
May 7, 2014    (FI) ..................... 20145417

(51) Int. Cl.
*A01D 34/83*    (2006.01)
*A01D 34/835*    (2006.01)
(Continued)

(52) U.S. Cl.
CPC ......... *A01D 34/835* (2013.01); *A01D 34/015* (2013.01); *A01G 23/00* (2013.01); *A01G 23/08* (2013.01)

(58) Field of Classification Search
CPC .... A01D 34/835; A01D 34/015; A01G 23/00; A01G 23/093
See application file for complete search history.

(56) References Cited

U.S. PATENT DOCUMENTS 1,012,962 A * 12/1911 Anderson ............ A01G 23/067
144/24.12
1,104,535 A * 7/1914 Moore ................. A01G 23/067
144/150
(Continued)

FOREIGN PATENT DOCUMENTS

DE    102005049716 A1    4/2007
EP    0562406 A1    9/1993
(Continued)

OTHER PUBLICATIONS

PCT/ISA/210—International Search Report—dated May 28, 2015 (Issued in Application No. PCT/FI2015/050188).
(Continued)

*Primary Examiner* — Jamie L McGowan
(74) *Attorney, Agent, or Firm* — Venable LLP; Jeffri A. Kaminski

(57) ABSTRACT

A cutting tool for clearing plant growth. The clearing tool includes a power transmission apparatus. An elongated part is coupled to the transmission to rotate around a longitudinal axis of the elongated part and having at least one thread that rises toward the transmission and the diameter of which decreases from an end of the elongated part coupled to the transmission to the end of the elongated part that is at a distance from the transmission. Guide parts are arranged around the elongated part to extend in the direction of the longitudinal axis of the elongated part. A blade part is arranged at the end of the elongated part coupled to the transmission. The elongated part, which, while targeted in a longitudinal direction toward the plant growth, is arranged to cut the plant growth when being rotated, wherein the threads transport the plant growth toward the blade part guided by the guide parts and cut the plant growth with the blade part.

13 Claims, 1 Drawing Sheet

(51) Int. Cl.
*A01G 23/08* (2006.01)
*A01D 34/01* (2006.01)
*A01G 23/00* (2006.01)

(56) References Cited

U.S. PATENT DOCUMENTS

| | | | | |
|---|---|---|---|---|
| 1,164,659 A | * | 12/1915 | Moore | A01G 23/067 144/219 |
| 1,504,963 A | * | 8/1924 | McKoy | A01G 23/06 144/2.1 |
| 1,530,654 A | * | 3/1925 | Daley | B65G 53/42 144/60 |
| 2,940,487 A | * | 6/1960 | O'Neill | A01G 23/067 144/134.1 |
| 3,241,216 A | | 3/1966 | Wellendorf | |
| 3,394,744 A | * | 7/1968 | Vit | A01G 23/093 144/162.1 |
| 4,018,255 A | * | 4/1977 | Diggs | A01G 23/091 144/24.12 |
| 4,121,777 A | * | 10/1978 | Kolstad | A01G 3/002 144/24.12 |
| 4,168,729 A | | 9/1979 | Tausig et al. | |
| 5,042,727 A | * | 8/1991 | Plante | A01G 23/093 144/162.1 |
| 5,378,852 A | | 1/1995 | Manor | |
| 6,751,895 B2 | * | 6/2004 | Paumier | A01G 23/067 144/24.12 |
| 6,840,026 B2 | * | 1/2005 | Pellenc | A01B 39/26 56/10.3 |
| D742,422 S | * | 11/2015 | Lowe | D15/21 |
| 9,382,689 B2 | * | 7/2016 | Chapman | E02F 3/96 |
| 2003/0062435 A1 | * | 4/2003 | Gross | A01G 3/002 241/242 |
| 2011/0041472 A1 | | 2/2011 | Rottinghaus | |

FOREIGN PATENT DOCUMENTS

| | | |
|---|---|---|
| FR | 2542155 A1 | 9/1984 |
| WO | WO-2014012626 A1 | 1/2014 |

OTHER PUBLICATIONS

PCT/ISA/237—Written Opinion of the International Searching Authority—dated May 28, 2015 (Issued in Application No. PCT/FI2015/050188).

* cited by examiner

CUTTING TOOL AND WORK MACHINE

CROSS-REFERENCE TO RELATED APPLICATIONS

The application claims priority to Finnish patent application 20145417 filed 7 May 2014 and is the national phase under 35 U.S.C. § 371 of PCT/FI2015/050188 filed 20 Mar. 2015.

FIELD OF INVENTION

The invention relates to clearing plant growth, such as a seeding stand, and the cutting tool and work machine used therein.

BACKGROUND OF THE INVENTION

Clearing a seeding stand is an essential part of forest management, especially in production forests, in which the objective of forest management is to achieve or even exceed production targets as calculated in the number of timber unit volumes, for example. However, clearing a seeding stand is not limited to production forests only and may also be considered a duty of a forest owner. The purpose of clearing a seeding stand is to ensure that the desired plant growth thrives in the seeding stand by removing the undesired plant growth. If the intention is to grow a spruce forest, seedlings of other wood species are cleared from the spruce seeding stand so that the spruce seedlings thrive.

MenSe manufactures clearing tools and blades for harvesters and excavators. Clearing tools and blades typically have two blades that are on top of each other with the prongs of the blades pointing in the same direction. The blades cut the plant growth as it is trapped between the overlapping blades. The length of the blades defines their working width that is much greater, 130 to 230 cm, for instance, than the diameter, 6 cm, for instance, of an individual plant growth to be cut.

Known cutting tools, such as clearing tools and blades, require precise alignment with the plant growth to be cut by bringing the blade of the cutting tool in contact with the plant growth being cut. Because the blade cuts with its entire length, which is quite long in relation to the typical diameter of a trunk in the plant growth, the cutting of plant growth beside a timber tree may be very difficult without damaging the timber tree. On one hand, when managing the blade, it is necessary to pay attention to other objects, such as rocks or other soil material in the terrain which do not necessarily have a commercial value like timber trees but may adversely affect the condition of the cutting tool when they come into contact with the blade. On the other hand, clearing a seeding stand with the cutting tool is possible only if the cutting tool is brought to the seeding stand and possibly momentarily even in contact with the soil material.

BRIEF DESCRIPTION OF THE INVENTION

An object of the invention is to develop an apparatus so as to enable at least some of the aforementioned problems to be solved. The object of the invention is achieved by a cutting tool and work machine.

An embodiment relates to a cutting tool for clearing plant growth, such as a seeding stand. The cutting tool comprises a power transmission apparatus and an elongated part which is coupled thereto to rotate around its own longitudinal axis and has threads rising toward the power transmission apparatus and having a diameter that decreases from the end of the elongated part coupled to the power transmission apparatus to the end that is at a distance from the power transmission apparatus, and guide parts arranged around the elongated part and extending in the direction of the longitudinal axis thereof, and a blade part arranged to the end of the elongated part which is coupled to the power transmission apparatus, whereby as the power transmission apparatus rotates the elongated part in the plant growth, the threads transport the plant growth toward the blade part guided by the guide parts.

An embodiment relates to a work machine for clearing a plant growth, such as a seeding stand, the work machine having a support part, such as boom, that is movable in relation to the work machine, and a cutting tool according to an embodiment is coupled to the support part and is movable with it to different distances from the work machine for the purpose of cutting plant growth, such as a seeding stand, with the cutting tool.

The invention is based on transporting the plant growth to the blade part of the cutting tool, which means that the blade part need not be brought in contact with the plant growth to cut it, and the working width of the blade part can be kept small. The cutting tool may be directed more freely to the plant growth to be cut, which means that objects, such as timber trees and soil material, that the blade part should not touch can be kept away from the blade part.

A cutting tool according to some of the embodiments of the invention is strong and simple in structure to make it durable. This way, the number of maintenance of the cutting blade and the work machine using it can be kept small.

BRIEF DESCRIPTION OF THE FIGURES

The invention will now be described in more detail in connection with preferred embodiments and with reference to the accompanying drawings, in which.

DETAILED DESCRIPTION OF THE INVENTION

Figure 1:
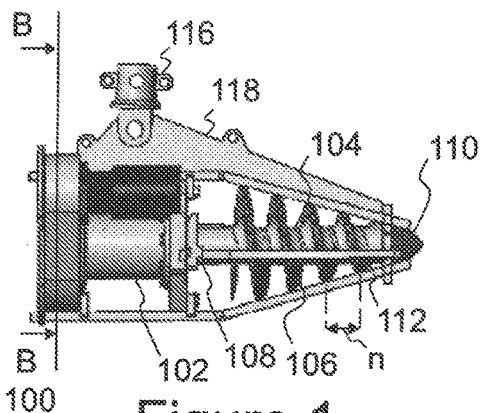
FIG. 1 is a side view of a cutting tool according to an embodiment.
Figure 2:
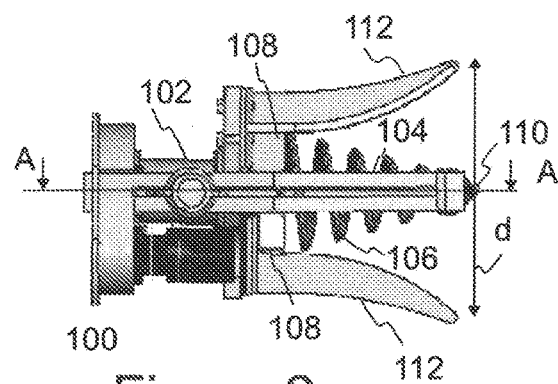
FIG. 2 is a top view of a cutting tool according to an embodiment.
Figure 3:
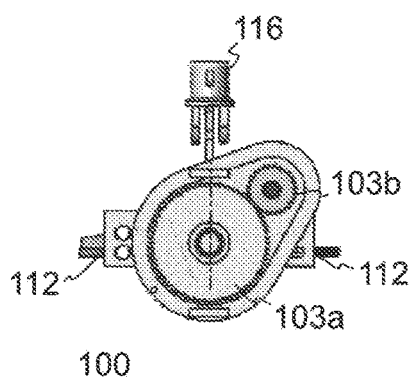
FIG. 3 shows a power transmission apparatus for a cutting tool according to an embodiment.
Figure 4:
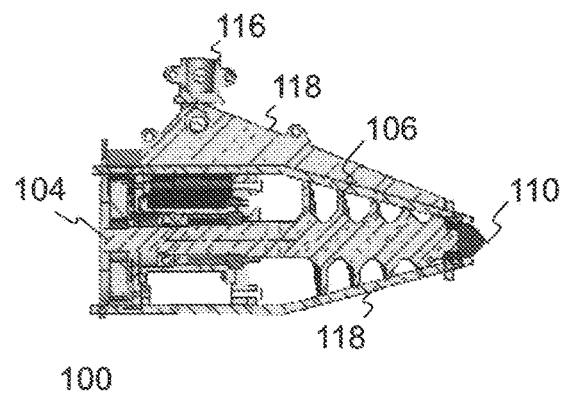
FIG. 4 shows a cross-section of a cutting tool.

In the following, cutting tools of some embodiments are described by referring to FIGS. 1 to 4, in which the same or similar objects are depicted with corresponding reference numbers and markings. The cutting tools shown in FIGS. 1 to 4 may illustrate different cutting tools or the same cutting tool. In some embodiments, FIG. 3 shows a cross-section B-B of the cutting tool of FIG. 1 and FIG. 4 shows a cross-section A-A of the cutting tool of FIG. 2. In the following description, the directions up and down are defined in relations to the effect of earth's gravity, which is downward. Thus, gravity defines the vertical direction. Sideways direction is essentially perpendicular to the vertical direction.

FIGS. 1 to 4 show a cutting tool 100 for clearing plant growth, such as a seeding stand. The cutting tool has a power transmission apparatus 102 and an elongated part 104 coupled thereto to rotate around its own longitudinal axis.

The power transmission apparatus may receive its driving power from a motor mechanically, electrically or through hydraulic fluid. The power transmission apparatus transmits the driving power received directly or through transmission to the elongated part to make it rotate.

The elongated part has one or more threads 106 which rise toward the power transmission apparatus and the diameter of which decreases from the end 108 of the elongated part coupled to the power transmission apparatus to the end 110 that is at a distance from the power transmission apparatus. The threads rise in the direction of the longitudinal axis of the elongated part. The elongated part is a piece with a dimension in one direction, for instance in the direction of the axis of the Cartesian coordinates, significantly larger than in the direction of the other axes. Examples of elongated parts comprise pieces, such as screws with a longitudinal axis, around which the circumference of the piece is smaller than the circumference measured around axes that are perpendicular to the longitudinal axis.

The cutting tool has guide parts 112 that are arranged around the elongated part in the direction of its longitudinal axis. At one end, the guide parts are fastened to the cutting tool to the body of the cutting tool, for instance. The body of the cutting tool can be formed by the power transmission apparatus or a frame structure connected thereto. This way the elongated part and guide parts are both fastened at their power transmission side end to the cutting tool.

The cutting tool has a blade part that is arranged to the end of the elongated part coupled to the power transmission apparatus. The blade part is preferably on both sides of the elongated part. The blade part can be implemented on both sides as a separate blade part that is between the elongated part and guide part. This way, each guide part has its own blade part.

When the power transmission apparatus rotates the elongated part in the plant growth, the threads transport the plant growth in front of the elongated part toward the blade part guided by the guide parts. Thus, the elongated part bites into the plant growth like a screw bites into a wall. In the next description, the term screw is used in different embodiments to refer to the elongated part 104.

The cutting tool cuts the plant growth, when the plant growth in front of it is transported by the threads to the blade part that is at the base of the screw and the plant growth is pressed against the blade part. The movement of the plant growth to be cut thus stops at the blade part where the plant growth is cut. Because the plant growth is transported to the blade part, the blade part need not be brought in contact with the plant growth to cut it, and the working width of the blade part can be kept small. The cutting tool may be directed more freely to the plant growth to be cut, which means that objects, such as timber trees and soil material, that the blade part should not touch can be kept away from the blade part.

In an embodiment, the guide parts are closer to the screw at the end where they are fastened to the cutting tool than at the end where the guide parts are free. This way, the guide parts open in the longitudinal direction of the screw, whereby plant growth is transported under the guidance of the elongated part from the length 'd' defined by the free ends of the guide parts toward the blade part. 'd' may be 350 to 400 mm, for instance, such as 380 mm. The distance 'd' defines the working width of the cutting tool.

In an embodiment, the distance between the free ends of the guide parts, length 'd', may be changed. The free ends of the guide parts may be adjustable mechanically, in a spring-loaded manner, or hydraulically to be at different distances from each other. In a cutting tool with several adjacent cutting tools and, therefore, also adjacent screws and guide parts, the working width may be greater than that of an individual cutting tool.

The blade part at the base of the screw is preferably of a width at least from the guide part to the screw, in which case all of the plant growth transported by the threads is cut between the guide part and screw. The blade part may be supported, fastened, or integrally connected to the guide part to facilitate the cutting of the plant growth.

The cutting tool comprises frame parts 118, to which the screw is supported. This way, the forces acting on the screw while plant growth is being cut are transmitted to the frame parts. A connecting part 116 is fixed to the frame part, or may be replaceable. The connecting part connects the cutting tool to the work machine that may be a feeder or feeder support part, such as boom or arm, of a wheel buggy, tractor, forestry machine or trailer. The connecting part is preferably coupled to the rotator of the work machine, with which the cutting tool can be controlled, rotated, for instance, as necessary. The frame parts of the cutting tool receive the forces, such as torsional forces, created when cutting plant growth, so the forces are not transmitted from the cutting tool to the support part or work machine.

The power transmission apparatus preferably comprises a hydraulic motor that transforms the pressure of hydraulic liquid into mechanical movement. The hydraulic motor can be coupled to the hydraulic system of the work machine, which is pressurised by the power source, such as combustion engine, of the work machine.

In an embodiment, the pitch 'n' of the cutting tool threads is arranged according to the thickness of the plant growth to be cut, whereby, when the power transmission apparatus rotates the screw in the plant growth, such as a seeding stand, the threads transport the plant growth toward the blade part guided by the guide parts, and a stump that has a diameter greater than the pitch of the threads splits. Thus, in the case that the diameter of the trunk to be cut is greater than the pitch of the threads, splitting takes place, and the plant growth being transported to the blade part is cut both against the blade part and guide part, when the plant growth is transported toward the blade part in the direction of the longitudinal axis of the screw. The pitch may be 60 to 70 mm, for instance, such as 62 mm.

When the diameter of the plant growth to be cut is greater than the pitch of the threads, the plant growth is cut against the blade part and thread. This results in the splitting of the stump remaining of the plant growth. The splitting of the stump is preferable for forestry management, because splitting speeds up the drying of the stump and, therefore, prevents the stump from putting ting out shoots. Further, splitting helps the entry of a pesticide and biocide into the stump and the natural decomposition of the stump. The pesticide and biocide can be spread after the seeding stand has been cleared, as is known to a person skilled in the art. Splitting the stump thus prevents shoots from growing and further helps the effect of other measures for preventing shoots. This way, at best, the seeding stand need not be cleared again and profit from the managed forest increases owing to the decreased costs from forestry work.

A thread pitch of 60 mm is especially suitable for the forestry management of largish seeding stands and young forests to maximize the cutting capacity. If the cutting tool is used for early management of plant growth, the thread pitch may even be smaller, such as 100 mm.

In an embodiment, the cutting tool has an adjustable transmission from the power transmission apparatus to the screw, in which case the adjustable transmission comprises at least two transmission positions corresponding to different trunk diameters. The transmission may be implemented with gears 103a, 103b that engage the axles of the power transmission apparatus and screw as well as to each other, which means that the size of the gears defines the transmission position. Several transmission positions can be implemented by altering the sizes of the gears, whereby the torque transmitted from the power transmission apparatus to the screw can be adjusted according to the need of different trunk diameters to cut them. Changing gears can be done by a gear system. Preferably, a smaller transmission is used for plant growth with trunk diameters larger than the pitch of the threads than for plant growth with trunk diameters smaller than the pitch of the threads. The pitch of the threads may be 60 to 70 mm, such as 62 mm, in which case the transmission for trunk sizes larger and smaller than the pitch can be selected in such a manner that the required power is as low as possible. A person skilled in the art understands that trunk sizes larger than the pitch of the threads require more power, because the trunks are cut against the thread and blade part on the cutting tool, which means that for diameters larger than the pitch, the transmission needs to be selected in such a manner that the power can be made high. Further, a lower power is sufficient for plant growth diameters smaller than the pitch of the threads.

In an embodiment, the screw threads on the cutting tools are shaped in such a manner that when the screw is rotates, the threads pull plant growth toward the blade part.

In an embodiment, the guide parts and/or frame parts of the cutting tool comprise edges that are toward the screw and sharpened. This way, the plant growth may be cut against both the guide part and the corresponding blade part.

In an embodiment, the threads of the cutting tool are sharpened so that the threads both transport the plant growth toward the blade part and cut the plant growth against the guide parts, when the screw is rotated with the power transmission apparatus. This is especially advantageous, when cutting plant growth having a trunk diameter that is larger than the pitch of the threads, in which case the trunks can be split with a lower force. Sharpened edges of the guide parts further promote the ease of cutting.

In an embodiment, the cutting tool comprises one or more blade parts, threads, and/or guide parts having a cutting surface for cutting plant growth. The cutting surface can be implemented by sharpening the blade part, thread, or guide part so that the sharpened part acts as the cutting surface.

In an embodiment, the cutting tool comprises several adjacent cutting tools. Each of the adjacent cutting tools may be a cutting tool according any one of the embodiments described above. Adjacent cutting tools permit a large working width that is especially suitable for seeding stand clearing performed by large and professional operators. The power transmission of adjacent cutting tools may be implemented by a unit shared at least partly by the adjacent cutting tools, in which case the driving power can be supplied from a work machine by using hydraulic liquid, for instance, to a power transmission apparatus shared by the cutting tools for the purpose of distributing the driving power between the adjacent cutting tools. The screws of the adjacent cutting tools may be arranged horizontally side by side in such a manner that their longitudinal axes are substantially parallel.

Figure 5:
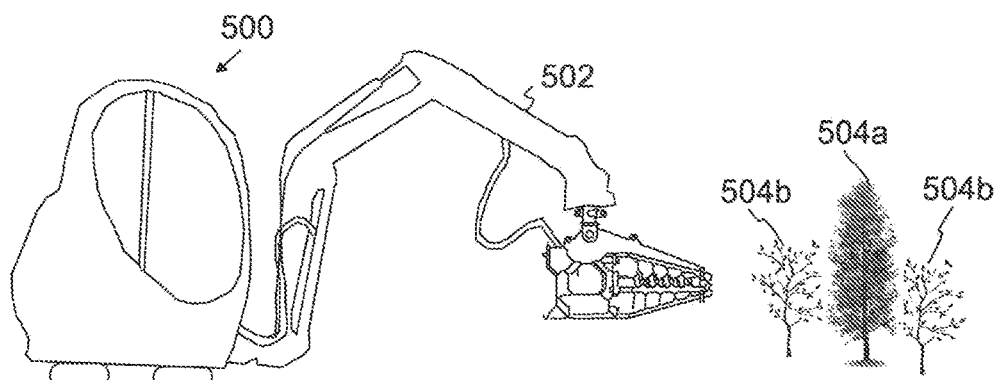
FIG. 5 shows a work machine with a cutting tool according to an embodiment coupled to it.

FIG. 5 shows a work machine 500. The work machine is presented in its conventional operating situation, in which it is used for clearing plant growth 504a, 504b, such as a seeding stand. The work machine has a support part 502, such as boom, that is movable in relation to the work machine, and a cutting tool according to an embodiment is coupled to the support part and movable with it to different distances from the work machine for the purpose of cutting plant growth 504, such as a seeding stand, with the cutting tool. The directions of movement of the support part determine the possible directions of movement of the cutting tool. Further, a connecting part 116 of the cutting tool may enable the inclination of the cutting tool. The connecting part may also couple the cutting tool fixedly to the work machine. FIGS. 1 to 4 shows cutting tools suitable for the work machine of FIG. 5. In FIG. 5, object 504a represents a spruce stand surrounded by broad-leaved seedlings 504b that are to be cleared with the work machine to allow the spruce stand to grow. In an embodiment, the work machine is a feeder or feeder part, such as boom or arm, of a wheel buggy, tractor, forestry machine or trailer.

It will be apparent to a person skilled in the art that as technology advances, the basic idea of the invention may be implemented in many different ways. The invention and its embodiments are thus not restricted to the examples described above but may vary within the scope of the claims.

The invention claimed is:

1. A cutting tool for clearing plant growth, the clearing tool comprising:
  a power transmission apparatus;
  an elongated part coupled to the power transmission apparatus to rotate around a longitudinal axis of the elongated part and having at least one thread that rise toward the power transmission apparatus and the diameter of which decreases from an end of the elongated part coupled to the power transmission apparatus to the end of the elongated part that is at a distance from the power transmission apparatus;
  guide parts arranged around the elongated part to extend in the direction of the longitudinal axis of the elongated part; and
  a blade part arranged at the end of the elongated part coupled to the power transmission apparatus,
  wherein the elongated part, which, while being targeted in a longitudinal direction toward the plant growth, is arranged to cut the plant growth when being rotated in the plant growth by the power transmission apparatus, wherein the threads transport the plant growth toward the blade part guided by the guide parts and cut the plant growth with the blade part, and
  wherein the power transmission apparatus includes an adjustable transmission, and the adjustable transmission comprises at least two transmission positions corresponding to different trunk diameters.

2. The cutting tool according to claim 1, wherein the pitch of the threads is arranged according to the thickness of the plant growth, whereby when the power transmission apparatus rotates the elongated part in the plant growth, the threads transport the plant growth toward the blade part guided by the guide parts and a stump that has a greater diameter than the pitch of the threads splits.

3. The cutting tool according to claim 1, wherein each guide part has an end fastened to the cutting tool and a free end, and the guide parts open in the longitudinal direction of the screw in such a manner that the free ends of the guide parts are further away from each other than the ends that are fastened to the cutting tool.

4. The cutting tool according to claim 1, further comprising:
  a smaller transmission configured to be utilized with plant growth with trunk diameters larger than the pitch of the threads than for plant growth with trunk diameters smaller than the pitch of the threads.

5. The cutting tool according to claim 1, wherein the threads of the elongated part are shaped in such a manner that when the elongated part is rotated, the threads pull the plant growth toward the blade part.

6. The cutting tool according to claim 1, wherein the guide parts comprise edges that extend toward the elongated part and that are sharpened.

7. The cutting tool according to claim 1, wherein the threads are sharpened so that the plant growth transported by the threads is cut against the guide parts, when the elongated part is rotated with the power transmission apparatus.

8. The cutting tool according to claim 1, wherein the cutting tool is a seeding stand.

9. A work machine for clearing plant growth, the work machine comprising:
   a support part that is movable in relation to the work machine;
   a cutting tool coupled with the support part, wherein the cutting tool is movable with the support part to different distances from the work machine for the purpose of cutting plant growth with the cutting tool by arranging an elongated part of the cutting tool in an longitudinal direction of the elongated part in connection with the plant growth; and
   a power transmission apparatus configured to rotate the cutting tool in the plant growth, and
   wherein the power transmission apparatus includes an adjustable transmission, further comprising:
   a smaller transmission configured to be utilized with plant growth with trunk diameters larger than the pitch of the threads than for plant growth with trunk diameters smaller than the pitch of the threads,
   wherein threads of the elongated part transport the plant growth toward a blade part guided by the guide parts and cut the plant growth with the blade part.

10. The work machine according to claim 9, wherein the work machine comprises a seeding stand.

11. The work machine according to claim 9, wherein the support part comprises a boom.

12. The work machine according to claim 9, wherein the work machine is a feeder or feeder part.

13. The work machine according to claim 9, wherein the feeder or feeder part is a boom or arm, of a wheel buggy, tractor, forestry machine or trailer.

* * * * *